United States Patent [19]

Karns

[11] Patent Number: 5,482,164
[45] Date of Patent: Jan. 9, 1996

[54] E-BLOCK SHIPPING COMB

[75] Inventor: Phillip L. Karns, Oklahoma City, Okla.

[73] Assignee: Seagate Technology, Inc., Scotts Valley, Calif.

[21] Appl. No.: 285,564

[22] Filed: Aug. 3, 1994

[51] Int. Cl.[6] .................................................. B65D 73/02
[52] U.S. Cl. ......................... 206/728; 206/560; 206/480
[58] Field of Search .................................. 206/328, 329, 206/332, 334, 1.5, 477, 480, 560, 559, 53

[56] References Cited

U.S. PATENT DOCUMENTS

| | | | |
|---|---|---|---|
| 352,770 | 11/1886 | Moore | 206/480 |
| 777,823 | 12/1904 | Webster et al. | 206/477 |
| 2,288,421 | 6/1942 | Rathbun | 206/45.15 |
| 3,050,184 | 8/1962 | Post | 206/53 |
| 4,069,915 | 1/1978 | Schurman | 206/305 |
| 4,535,887 | 8/1985 | Egawa | 206/328 |
| 4,991,714 | 2/1991 | Clatanoff | 206/328 X |
| 5,184,723 | 2/1993 | Karl et al. | 206/454 |
| 5,310,049 | 5/1994 | Bigelow et al. | 206/53 |
| 5,373,938 | 12/1994 | Kubo | 206/328 |

OTHER PUBLICATIONS

5–Page Schematic of Prior Art Shipping Comb, Seagate Technology, Inc. (1994).

*Primary Examiner*—Steven N. Meyers
*Assistant Examiner*—Tara L. Laster
*Attorney, Agent, or Firm*—Westman, Champlin & Kelly

[57] ABSTRACT

An E-block shipping comb includes a frame adapted to support an E-block assembly. A guide element of the frame is adapted for positioning the E-block assembly in the frame. A movable latch is movable between first and second positions. In the first position, the E-block assembly is free to be placed into or withdrawn from the frame. In the second position, the E-block assembly is held in position in the frame.

6 Claims, 4 Drawing Sheets

E-BLOCK SHIPPING COMB

BACKGROUND OF THE INVENTION

The present invention relates to E-block assemblies of the type used in information storage systems. More specifically, the present invention relates to a shipping comb for supporting an E-block assembly.

E-block assemblies are used in storage systems in which information is stored on a plurality of discs. E-block refers to the assembly which is used to support transducing heads over surfaces of the discs. As the discs spin, the transducers are able to read and write information from selected tracks on the disc surfaces by selectively positioning the E-block assembly.

An E-block assembly includes an E-block frame which has a plurality of armatures. Typically, the E-block frame is cast as a single unit. The frame rotates about a central pivot on a bearing. Each of the E-block frame armatures couples to flexure arms which each support a transducing head. Flexure arms are typically spring loaded and provide a force which urges the transducing head against the disc surface. During operation, the discs spin and aerodynamics of sliders which carry the transducer heads cause the heads to be lifted from the surfaces of the discs. This lifting force counteracts the spring loaded flexure arms. Opposite the transducing heads on the E-block frame is a coil. The coil is used to move the E-block frame about the pivot.

E-block assemblies are typically quite delicate and difficult to transport. E-block shipping combs are used to secure E-block assemblies during transport. Such combs typically include a frame from which a plurality of fingers extends. These fingers are received between the flexure arms and the armatures of the E-block frame. A friction fit between the E-block and the fingers secures the E-block to the frame. Top and bottom covers are secured to the shipping comb and lock the E-block assembly into the frame of the shipping comb. This prior art design requires contact between the E-block assembly and the shipping comb and tray, and requires metal components of the E-block assembly to rub against plastic and/or metal components of the shipping comb. This wears down portions of the E-block assembly and leads to particulate contamination. Further, fabrication of prior art E-block combs is expensive and requires a high degree of machining precision.

A need exists for an E-block shipping comb which is inexpensive, easily fabricated and does not damage the E-block assembly.

SUMMARY OF THE INVENTION

The present invention is an E-block shipping comb for supporting E-block assemblies. The shipping comb includes a frame for supporting the E-block assembly. Guide elements coupled to the frame receive the E-block assembly and position it within the frame. A movable latch coupled to the frame is movable between a first and a second position. In the first position, the E-block is free and may be inserted into or removed from the frame. In a second position, the E-block assembly is held in the frame. In one preferred embodiment, the latch is a lever arm which moves about a pivot point.

DETAILED DESCRIPTION OF THE PREFERRED EMBODIMENTS

Figure 1:
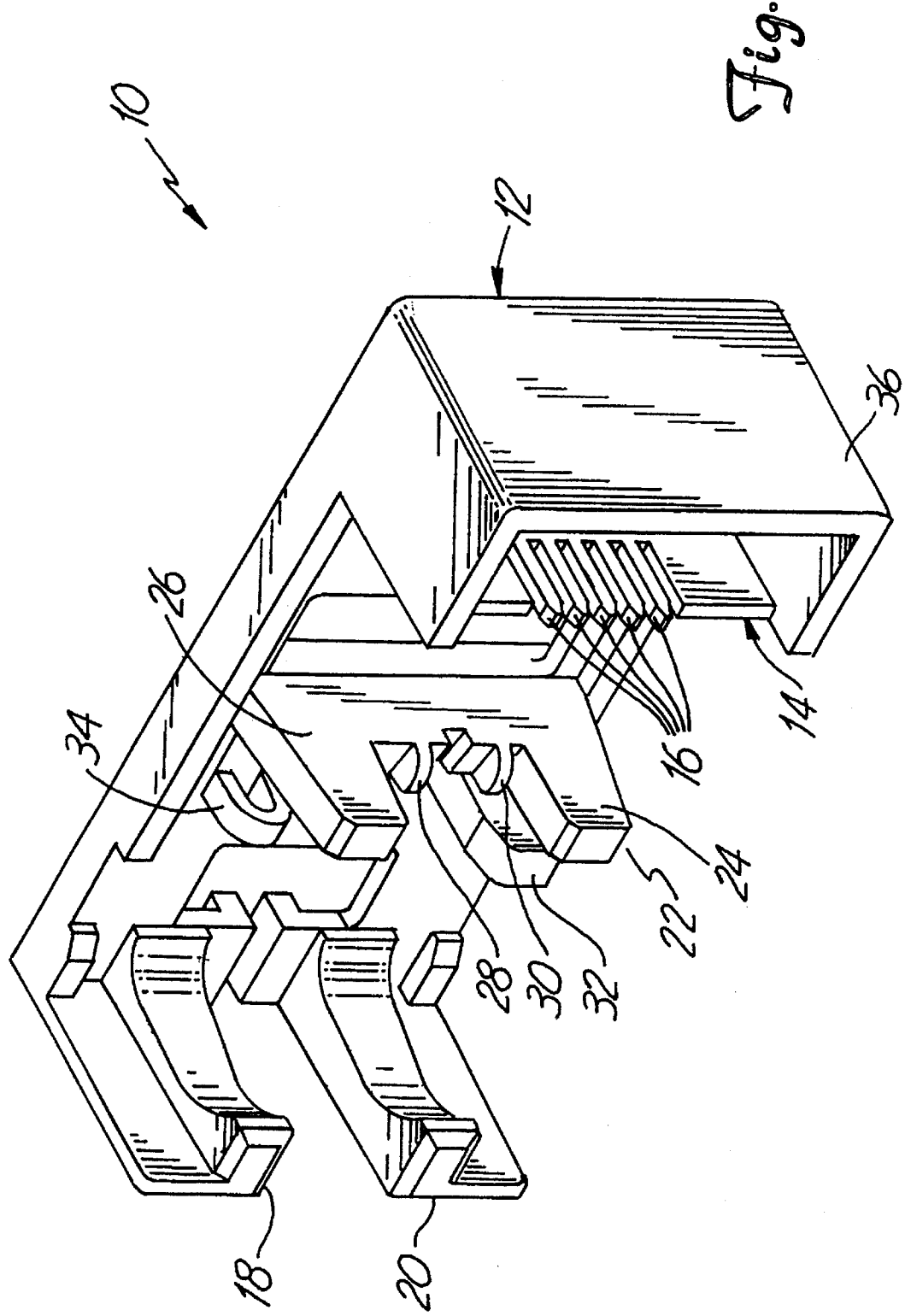
FIG. 1 is a front perspective view of an E-block shipping comb in accordance with the present invention.

FIG. 1 is a front perspective view of E-block shipping comb 10 in accordance with the present invention. E-block shipping comb 10 includes comb frame 12 which carries flexure comb 14, upper rear clamp 18 and lower rear clamp 20. Flexure comb 14 includes fingers 16 for separating flexures of an E-block assembly. Shipping comb 10 includes guiding element 22 having lower guide 24, upper guide 26, upper tab 28 and lower tab 30. Comb 10 also includes lower securing arm 32 and latch guide 34 coupled to frame 12. Shielding 36 surrounds and protects the region of flexure comb 14.

Figure 2:
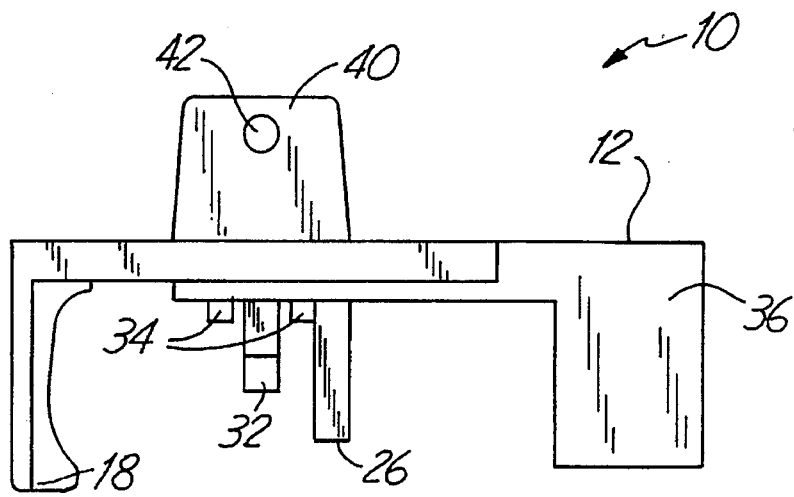
FIG. 2 is top plan view of the E-block shipping comb of FIG. 1.

FIG. 2 is a top plan view of E-block shipping comb 10. In addition to those features shown in FIG. 1, FIG. 2 also shows a second portion of latch guide 34. The operation of latch guide 34 will be explained in more detail below. FIG. 2 also shows support 40 and spring guide 42 coupled to frame 12.

Figure 3:
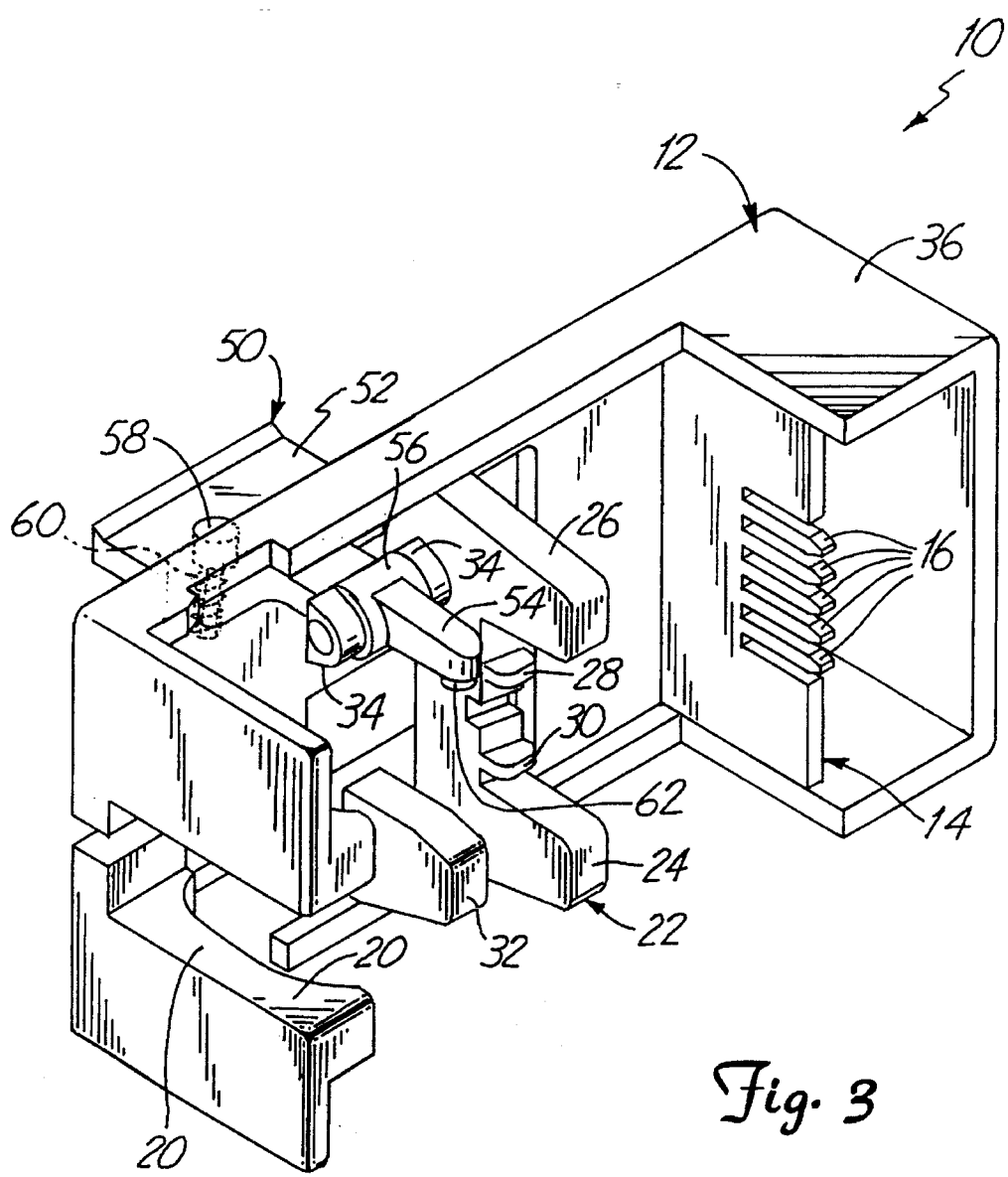
FIG. 3 is a rear perspective view of the E-block shipping comb of FIG. 1.

FIG. 3 is a rear perspective view of E-block shipping comb 10 including latch 50 in accordance with the invention. Latch 50 includes actuator tab 52 and lever arm 54. Latch pivot 56 is received in latch guide 34. A spring receptacle 58 is formed in tab 52 and receives spring 60. Spring 60 is also received by spring guide 42, shown in FIG. 2. A distal end of latch 50 on lever arm 54 carries a retaining tab 62.

Figure 4:
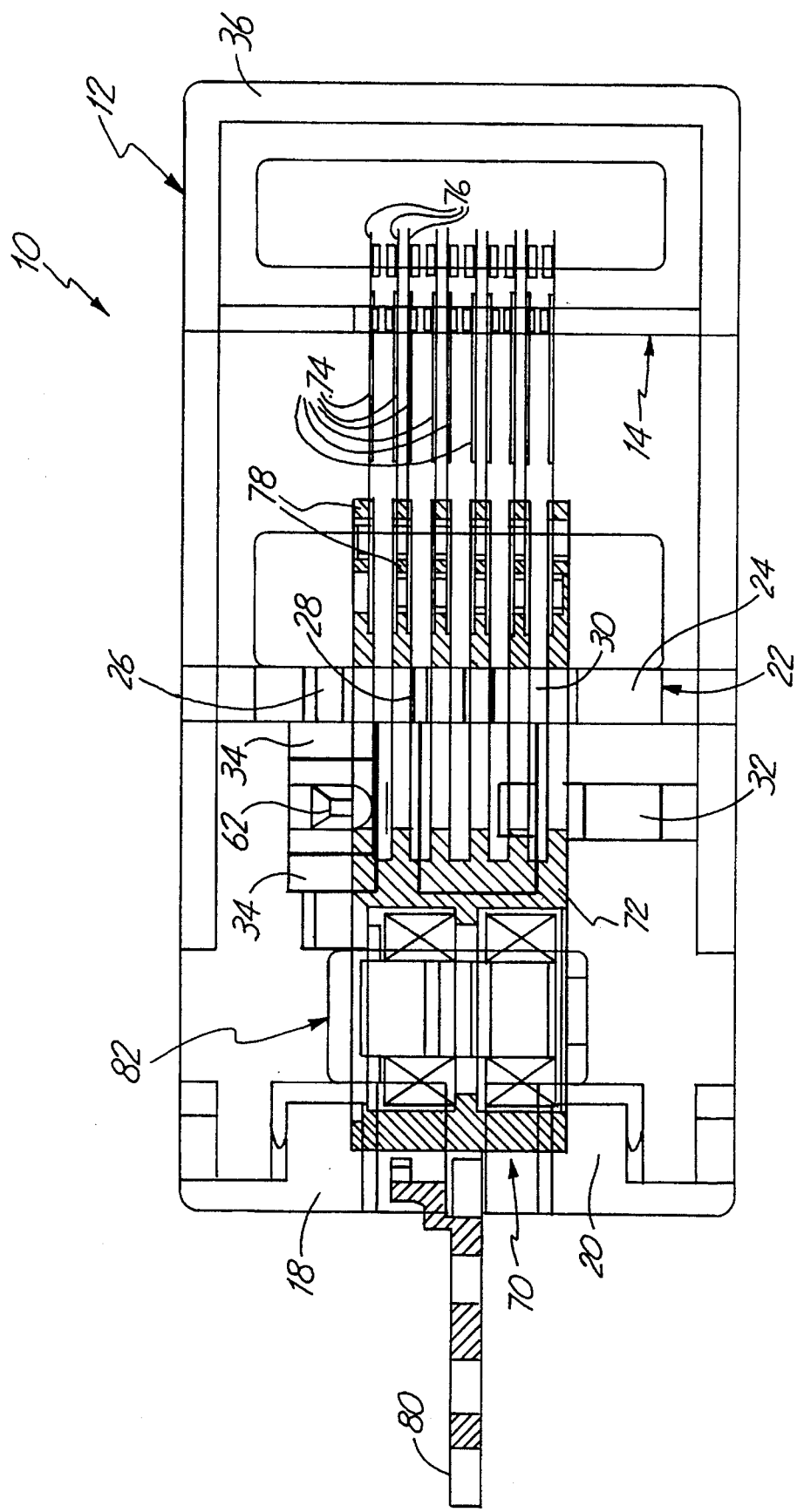
FIG. 4 is a front plan view of the E-block shipping comb of FIG. 1 including an E-block assembly held therein.

FIG. 4 is a front plan view of E-block shipping comb 10 including E-block assembly 70. E-block assembly 70 includes E-block frame 72 which carries flexure arms 74 on E-block frame armatures 78, each having a transducing head 76 at its distal end. Also carried on E-block frame 72 opposite flexure arms 74 is coil 80. A bearing assembly 82 is carried in E-block frame 72. As shown in FIG. 4, retaining tab 62 of latch 50 fits into an opening 88 of frame 72 securing frame 72 against lower securing arm 32.

Figure 5:
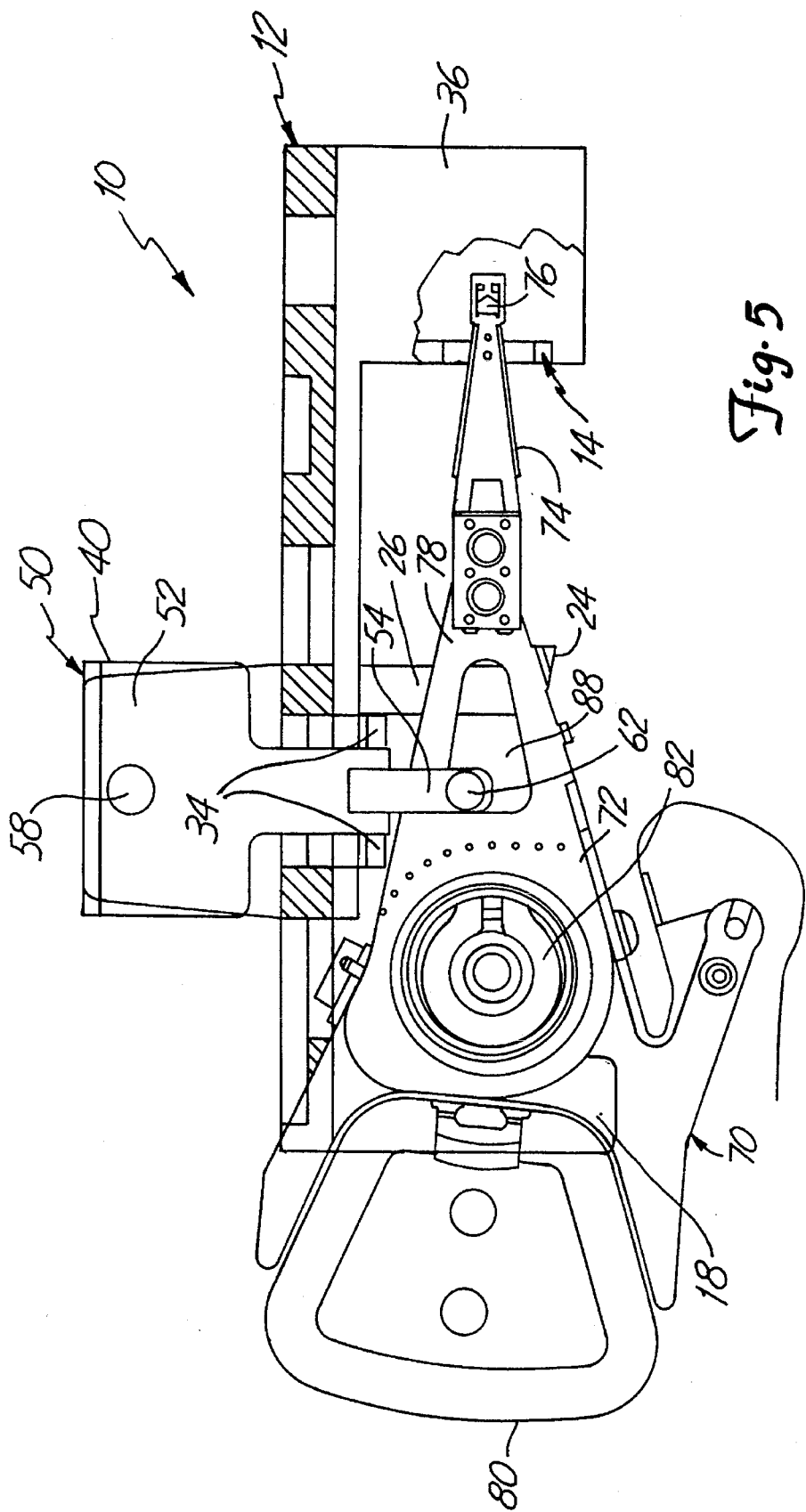
FIG. 5 is a top plan view of the E-block shipping comb and E-block assembly of FIG. 4.

FIG. 5 is a top plan view of E-block shipping comb 10 including E-block assembly 70. FIG. 5 shows the relationship between latch 50 and E-block assembly 70.

In operation, shipping comb 10 securely holds E-block assembly 70 for transport. Flexure comb 14 receives flexures 74, and fingers 16 secure and separate flexures 74 from each other. Rear clamps 18 and 20 receive E-block frame 72. Retaining tab 62 is received in opening 88 of E-block armature 78. E-block armatures 78 are also supported by lower securing arm 32. Additionally, guide assembly 22 supports E-block armatures 78.

An operator may selectively release E-block assembly 70 by pressing tab 52 of latch 50 downward toward support 40 against the force of spring 60. This causes latch 50 to rotate about the pivot formed by latch guide 34 causing retaining tab 62 to move upward out of the open area 88 of E-block armature 78. Heads 76 may then be twisted out of flexure comb 14 and the E-block assembly pulled from guide 22 and frame 12. To place an E-block 70 into E-block comb 10, the rear portion of frame 72 is placed into clamps 18 and 20. The E-block assembly 70 is then turned inward so that heads 76 and flexure arms 74 are received by flexure comb 14 and E-block armatures 78 are received by guide 22 and supported by guides 24 and 26 and tabs 28 and 30. This is done as an operator holds tab 52 of latch 50 downward, thereby forcing tab 50 of lever arm 54 upward. Once E-block assembly 70 is completely received within E-block shipping comb 10, the operator releases tab 52 thereby allowing tab 60 to seat into opening 88 of E-block armature 78 securing E-block assembly 70.

The present invention offers a number of advantages. The invention securely holds an E-block assembly without requiring a prior art-type friction fit which can lead to metal-on-metal/plastic wear causing particulate contamination. In one preferred embodiment, E-block shipping comb 10 is formed from plastic or other suitable non-metal material so as not to cause excessive wear on E-block assembly 70. Further, the invention does not require top and bottom covers to be placed onto the shipping comb to secure the E-block assembly. These covers are difficult to use and shock on these covers in such a prior art design is directly transferred to the E-block assembly, which can cause damage. The E-block shipping comb of the present invention is easily used, and easily and inexpensively fabricated.

In one preferred embodiment, shipping comb 10 is made from Statcon-D, available from Minnesota Mining and Manufacturing Company-of St. Paul, Minn. Statcon-D is a plastic which dissipates static electricity. Comb 10 can be fabricated in a single mold for reducing manufacturing cost. Spring 60 preferably comprises stainless steel.

Although the present invention has been described with reference to preferred embodiments, workers skilled in the art will recognize that changes may be made in form and detail without departing from the spirit and scope of the invention.

What is claimed is:

1. An E-block shipping comb, comprising:

a frame having a front and a rear;

a flexure comb coupled to the front of the frame adapted for receiving flexures of an E-block assembly;

a clamp coupled to the rear of the frame adapted for receiving an E-block frame of the E-block assembly;

a guide coupled to the frame between the flexure comb and clamp, adapted for receiving armatures of the E-block assembly the guide comprises a first arm for receiving a top portion of an E-block frame of the E-block assembly and a second arm for receiving a bottom portion of the E-block frame; and a latch coupled to the frame and moveable between a first position and a second E-block securing position.

2. The E-block shipping comb of claim 1 wherein the latch is a lever arm moving about a pivot point.

3. The E-block shipping comb of claim 2 including a spring urging the lever arm into the second position.

4. The E-block shipping comb of claim 2 wherein the lever arm includes a tab for an operator to move the lever arm into the first position.

5. The E-block shipping comb of claim 1 wherein the flexure comb comprises at least one elongated finger.

6. The E-block shipping comb of claim 1 wherein the guide includes at least one tab adapted to fit between armatures of the E-block assembly.

* * * * *